United States Patent
Mathur et al.

(10) Patent No.: US 9,635,055 B2
(45) Date of Patent: Apr. 25, 2017

(54) ENCRYPTION LEVELS FOR SECURE APPLICATION CONTAINERS

(71) Applicant: defend7, Inc., Mountain View, CA (US)

(72) Inventors: Gaurav Mathur, Palo Alto, CA (US); Vibhav Sreekanti, Pleasanton, CA (US)

(73) Assignee: defend7, Inc., Mountain View, CA (US)

( * ) Notice: Subject to any disclaimer, the term of this patent is extended or adjusted under 35 U.S.C. 154(b) by 22 days.

(21) Appl. No.: 14/607,685

(22) Filed: Jan. 28, 2015

(65) Prior Publication Data

US 2016/0219073 A1    Jul. 28, 2016

(51) Int. Cl.
*G06F 7/04*     (2006.01)
*H04L 29/06*    (2006.01)
*G06F 21/12*    (2013.01)

(52) U.S. Cl.
CPC ........... *H04L 63/168* (2013.01); *G06F 21/12* (2013.01); *H04L 63/061* (2013.01); *H04L 63/105* (2013.01)

(58) Field of Classification Search
CPC .... H04L 63/168; H04L 63/061; H04L 63/105
See application file for complete search history.

(56) References Cited

U.S. PATENT DOCUMENTS

| | | | | |
|---|---|---|---|---|
| 8,904,477 B2* | 12/2014 | Barton | ................. | G06F 21/604 380/270 |
| 2006/0234731 A1* | 10/2006 | Taylor | ................. | H04L 63/0442 455/466 |
| 2013/0124851 A1* | 5/2013 | Kain | ................... | H04L 63/0428 713/151 |

* cited by examiner

*Primary Examiner* — Krisna Lim (57) ABSTRACT

Systems, methods, and software described herein provide encryption configurations for secure application containers. In one example, a method of operating a management system to provide encryption configurations to secure application containers includes identifying an encryption configuration from a plurality of encryption configurations for an application container. The method further includes transferring the encryption configuration to the application container, wherein the encryption configuration configures a security layer in the application container to act as an encryption intermediary between an application in the application container and processes external to the application container.

20 Claims, 8 Drawing Sheets

ENCRYPTION LEVELS FOR SECURE APPLICATION CONTAINERS

TECHNICAL FIELD

Aspects of the disclosure are related to computing security and in particular to providing encryption configurations to secure application containers.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

A firewall is a software or hardware-based network security system that controls the incoming and outgoing network traffic based on applied rule set. For example, a firewall may be implemented in a computing system to prevent incoming connections from possibly harmful computing systems. Further, encryption is the process of encoding messages or information in such a way that only authorized parties may read or understand the saved material. Thus, if users attempt to store sensitive information, such as social security information, encryption may be used as a failsafe to prevent unwanted parties from understanding the information even if the stored data is accessible.

In addition to the protective measures discussed above, segregation methods have also been pursued to limit the interaction between systems and applications. These segregation methods include whole system virtualization, which includes a full operating system and one or more applications, as well as application containers that are used to reduce dependencies on other cooperating applications. However, separating the applications into different virtual machines or application containers can add complexity to the security configurations for each of the executing applications.

OVERVIEW

Provided herein are systems, methods, and software to provide encryption levels to application containers. In one example, a method of operating a management system to provide encryption configurations to secure application containers includes identifying an encryption configuration from a plurality of encryption configurations for an application container. The method further includes transferring the encryption configuration to the application container, wherein the encryption configuration configures a security layer in the application container to act as an encryption intermediary between an application in the application container and at least one process or system external to the application container.

In a further instance, a computer apparatus to provide encryption configurations to secure application containers includes processing instructions that direct a management system to identify an encryption configuration from a plurality of encryption configurations for an application container. The processing instructions further direct the management system to transfer the encryption configuration to the application container, wherein the encryption configuration configures a security layer in the application container to act as an encryption intermediary between an application in the application container and at least one process or system external to the application container. The computer apparatus further includes one or more non-transitory computer readable media that store the processing instructions.

In another example, an application container to isolate an application from one or more other processes executing outside of the application container includes the application and a security layer. The security layer may be configured to act as an intermediary between the application and at least one process or system external to the application container, wherein the security layer comprises an encryption module configured to encrypt data communications for the application based on a security level for the application container.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Internet services rely extensively on security to prevent unpermitted processes and users from accessing sensitive data. Such data may include usernames, passwords, social security numbers, credit card numbers, amongst other sensitive data. To prevent the unpermitted access, firewalls, antiviruses, and other security processes may be executed on the devices hosting the internet services. These security processes are designed to prevent improper access, or mitigate the effects once a breach has occurred.

In some examples, multiple applications may be necessary to provide specific services to end user devices, such as front-end applications, back-end applications, data service applications, or any other applications. Each of these applications are responsible for a particular task, such as taking in and storing data, processing data that is received, organizing data received, or any other task necessary for the service. These applications may be implemented on one or more computing devices configured by an administrator to perform the associated service.

In the present example, application containers are provided to segregate and help secure data as it is used within a computing environment. These application containers, which operate on a host system, can package an application and its dependencies in a virtual container, and run the containerized applications as an isolated process on the host operating system. These containers may include Linux containers, jails, partitions, or other types of containment modules, and may also include virtual machines in some examples. Accordingly, because the application does not contain dependencies from other applications, the application is essentially segregated from other applications and processes executing on the same host computing system.

Here, in addition to the application, the container also includes a security layer to act as a barrier or intermediary between the application, and other processes or systems external to the application container. This security layer may include encryption, firewall, storage interface, and communication interface modules that can be configured based on the application for the container. For example, a front-end application that places data within a storage volume may not require access to sensitive data values, such as social security numbers and credit card numbers. Accordingly, rather than permitting the application read the received sensitive data, the security layer may transparently encrypt the received data before passing the data to the application.

To manage the encryption and security keys for the application containers, a key management service is provided. The key management service may be used to configure and provide the security layers with the appropriate encryption keys and parameters for operation. In some examples, the key management service may be used to provide various levels of encryption to the application container. These levels may be based on the sensitivity of the data, the security level allocated by an administrator to the container, the type of application in the container, or any other method of determining the security level for the application container. For instance, a segment of data with a high level of sensitivity may be encrypted using a hardware security module (HSM) that is external to the application container before the data is passed to the application within the application container. In other examples, the data may be less sensitive. Accordingly, rather than passing the data to an external module, encryption keys may be provided or "checked out" by the key management service to allow the encryption of the data to occur using the security layer within the application container.

In some instances, the security layer within the application container is configured during the provisioning of the application container. For example, an administrator may specify that the data is of high sensitivity and require the security layer to transfer the data to a HSM prior to processing the data. In other occurrences, the encryption configuration may be specified at run time of the application container. Thus, when the application container is initiated on a host computing system, the security layer may contact the key management service or some other similar management module to determine the encryption parameters for data communicated with the application.

Figure 1:
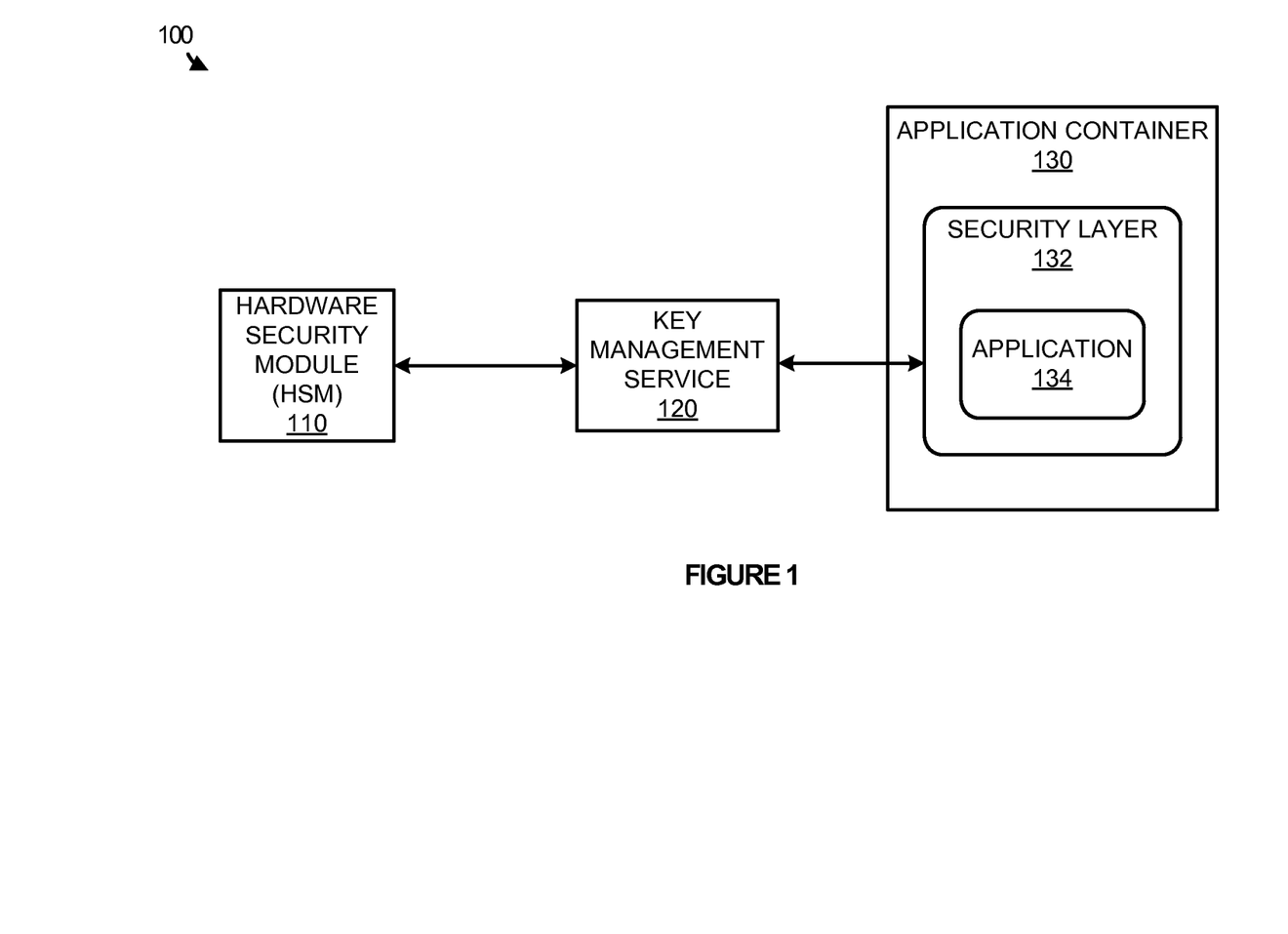
FIG. 1 illustrates a computing environment for providing varying levels of encryption key security.

To further illustrate implementing encryption configurations for application containers, FIG. 1 is provided. FIG. 1 illustrates a computing environment 100 for providing varying levels of encryption key security. Computing environment 100 includes hardware security module (HSM) 110, key management service 120, and application container 130. Application container 130 further includes security layer 132, which is used to provide intermediary security between application 134, and processes, data storage systems, or computing systems external to application container 130.

In operation, an administrator or some other management service provisions application container 130 to be an easily portable and segregated environment for application 134. This environment includes all of the files, directories, and other application elements to execute application 134 without identifying or requiring other applications on the same host computing system. Application container 130 may comprise a Linux container, a jail, a partition, a full operating system virtual machine, or any other similar containment module. In some examples, during the provisioning of application container 130, the administrator may define a security level for the various data that is communicated with application 134. This data may include token data, such as names, user preferences, or other similar data, but may also include highly sensitive data, such as social security numbers, credit card numbers, and passwords. Accordingly, the administrator may prefer to define a method of encrypting the data to prevent the application from identifying unnecessary sensitive data.

In some examples, security information may be used to define a security level for the application, wherein the security level corresponds to an encryption method for an application container. This security information may include the sensitivity of the data, a user specified security level, or a security level based on the application within the application container. For instance, as demonstrated in computing environment 100, encryption of the data may occur within application container 130 using security layer 132, may occur in key management service 120, or may occur using HSM 110. In situations where the data is the most sensitive, such as for usernames and passwords, the security layer may deflect or transfer the data to HSM 110 to be encrypted before the data is returned to application 134. In other examples, when the data is less sensitive, a key may be checked out to key management service 120, allowing key management service 120 to receive the sensitive data from security layer 132, encrypt the sensitive data, and return the data to application 134. In other examples, where data is the least sensitive, security layer 132 may check out an encryption key and encrypt the data locally using the key before passing the data to the application. Thus, HSM 110 may be used to encrypt data when the data is most sensitive, key management service 120 may be used to encrypt data when the data is intermediately sensitive, and security layer 132 may be used to encrypt the data when the data is least sensitive.

Figure 2:
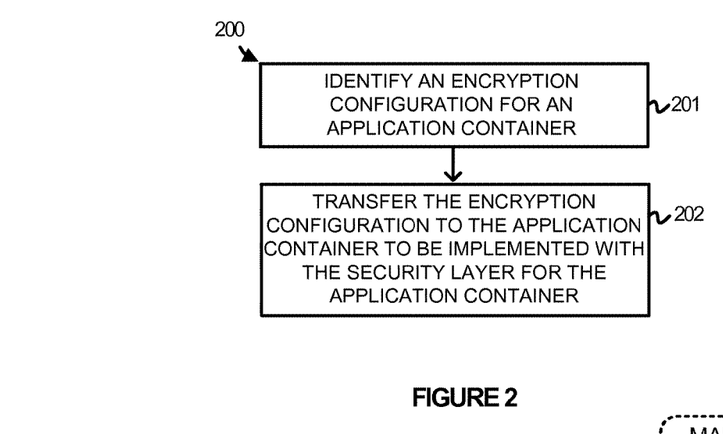
FIG. 2 illustrates a method of configuring application containers to encrypt data using multiple encryption levels.

Referring now to FIG. 2, FIG. 2 illustrates a method 200 of configuring application containers for encrypting data using multiple encryption levels. As described in FIG. 1, application containers, such as application container 130, may include an application 134 and a security layer 132 that acts as an intermediary between the application, and processes or systems external to application container 130. For example, security layer 132 may include a firewall module, an encryption module, a storage interface module, a communication interface module, or any other similar security module to prevent improper communications with the application.

In some examples, the encryption module within the security layer may have a variety of configurations that are available based on the data processed within the application. For instance, an application that processes user preferences may have a different encryption configuration than an application that processes credit card information and social security numbers. Accordingly, a management service, such as key management service 120 or any other similar administrative service may desire to configure security layer 132 based on the data processed by application 134.

To configure the security layer, the management service identifies an encryption configuration for the application container (201). In some examples, the configurations include the ability to encrypt using an HSM, the ability to use a key management service that manages the encryption keys and configurations for one or more application containers, or the ability to encrypt using the security layer itself. These different configurations allow a variety of different security levels to be accommodated. For instance, social security numbers may be encrypted using the HSM, whereas user preferences may be encrypted using encryption keys checked out to the security layer within the application container.

In some occurrences, security information may be used to identify the appropriate security level for an application container, such as user specified security information, sensitivity information about the data being processed, or the type of application within the container. Once a security level is defined based on the security information, an encryption configuration may be generated that corresponds to the security level for the application.

Once the encryption configuration is generated for the application container, the configuration is then transferred to the application container to be implemented within the security layer of the application container (202). This transferring of the configuration may be done when the application container is initially provisioned in some examples. Accordingly, as the application container is generated with the security layer and application, the security layer may be constructed with the appropriate encryption configuration. In other instances, the encryption configuration may be transferred to the security layer upon deployment of the application container. For example, when application container 130 is instantiated on a host computing system, security layer 132 may initiate a request to be configured. Accordingly, an administrator, or some other management system, may define the encryption configuration for the application 134 and transfer the configuration to the recently initiated application container 130.

Figure 3:
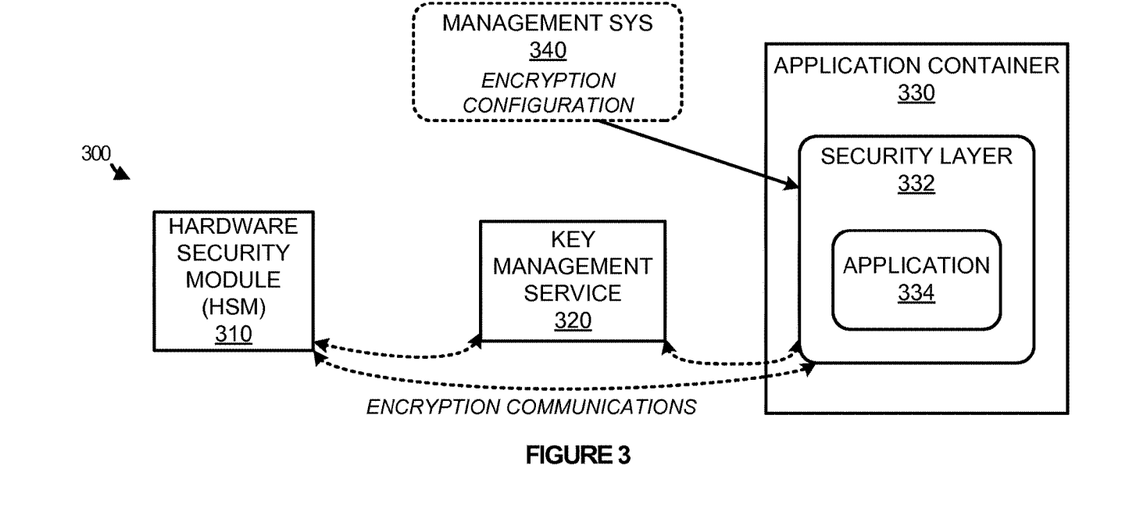
FIG. 3 illustrates an overview of configuring application containers to encrypt data using multiple encryption levels.

Turning to FIG. 3, FIG. 3 illustrates an overview 300 of configuring application containers to encrypt data using multiple encryption levels. Overview 300 includes hardware security module (HSM) 310, key management service 320, application container 330, and management system 340. Application container 330 further includes security layer 332 that acts as an intermediary between application 334 and processes or systems external to application container 330. Although illustrated separate in the present example, it should be understood that management system 340 might be implemented wholly or partially within key management service 320.

As depicted, an encryption configuration is transferred from management system 340 to application container 330 to configure the encryption of data received and transferred from application 334. This encryption configuration may be generated by a separate management system, as illustrated in FIG. 3, that is used to configure application containers as they are initiated within a computing environment, may be generated by a provisioning system that provisions the application container, may be generated by key management service 320, or may be generated by any other management system. Once the encryption configuration is received, security layer 332 may implement the configuration allowing data received or transferred by the application to be encrypted based on the security level for the application. As illustrated in FIG. 3, key management service 320 and HSM 310 may assist in encrypting the application data. HSM 310 is a physical computing device that safeguards and manages digital keys for authentication and encryption of data. Accordingly, HSM 310 may be used when the application data is most sensitive, such as for social security numbers, credit card numbers, and the like. Similarly, key management service 320 and security layer 332 may be used for encryption when the data is not as sensitive, which may reduce latency associated with encrypting data outside of the application container.

Figure 4:
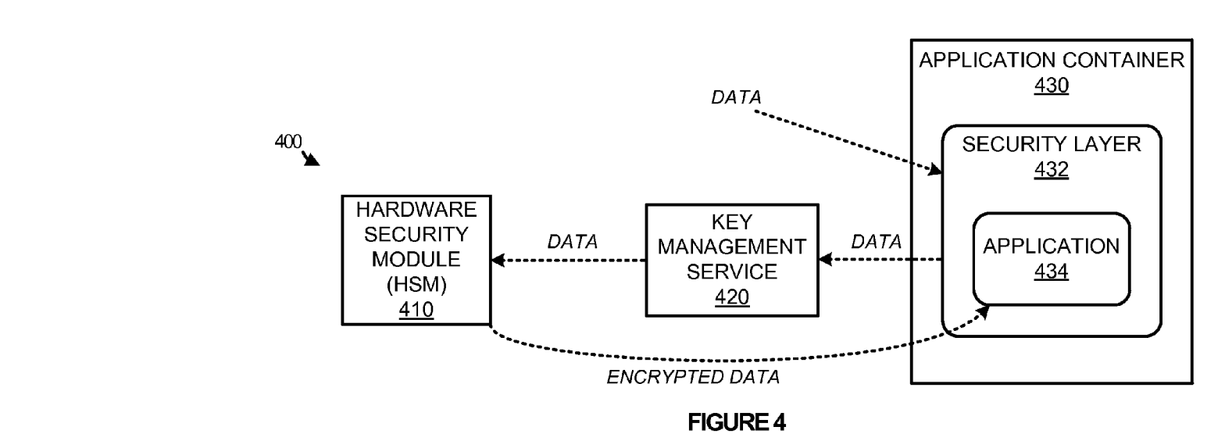
FIG. 4 illustrates an overview of encrypting data for an application container using a hardware security module.

As a further example of providing encryption levels to application containers, FIG. 4 is provided. FIG. 4 illustrates an overview 400 of encrypting data for an application container using a hardware security module. Overview 400 includes hardware security module (HSM) 410, key management service 420, and application container 430. Application container 430 further includes security layer 432, which is used to provide intermediary data security between application 434 and at least one process or system external to application container 430.

As demonstrated in FIG. 4, security layer 432 has been configured with an encryption level that requires data to be encrypted using HSM 410. This encryption level may be set for some of the most sensitive data, such as social security numbers, that do not need to be identified by application 434. For example, if application 434 comprised a front end server application that forwards data to a storage repository, the front end server may not need access to the actual social security number values. Thus, the values may be encrypted before being processed by application 434. Here, as application container 430 receives data, security layer 432 redirects the data to key management service 420. Key management service 420 may be used to manage the encryption of data for one or more application containers, and may further be used as an intermediary between the application containers and HSM 410.

Once the data is received from security layer 432, key management service 420 transfers the data to HSM 410 to encrypt the data. Upon encrypting the data, HSM 410 returns the data to application container 430 to be processed by application 434. Thus, application 434 may process the data without knowledge that the data has already been encrypted using security layer 432 and HSM 410. Although illustrated as being passed directly from HSM 410 to application container 430, it should be understood that HSM 410 might use key management service 420 as an intermediary to transfer the data to application container 430.

Figure 5:
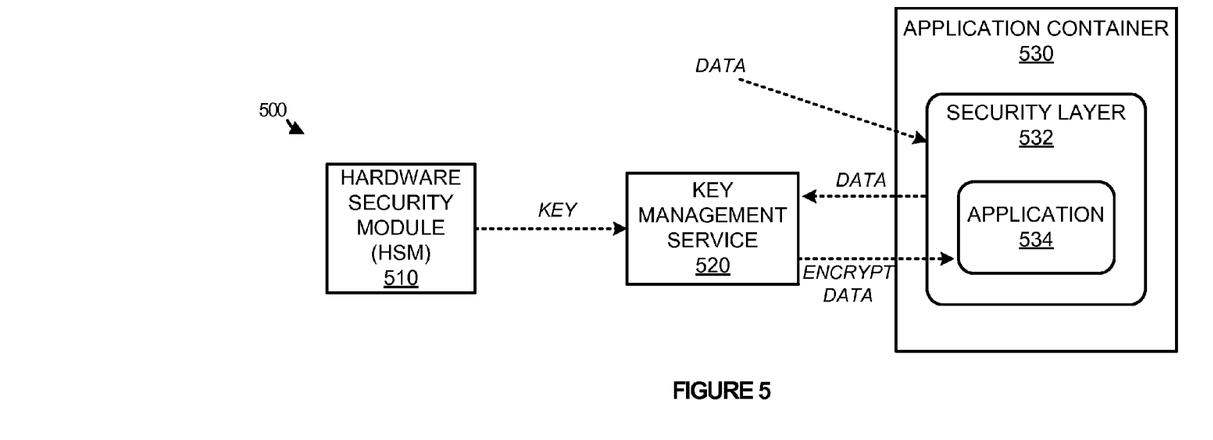
FIG. 5 illustrates an overview of encrypting data for an application container using a key management service.

As a further example of implementing encryption configurations, FIG. 5 is provided. FIG. 5 illustrates an overview 500 of encrypting data for an application container using a key management service. Overview 500 includes hardware security module (HSM) 510, key management service 520, and application container 530. Application container 530 further includes security layer 532, which is used to provide intermediary security between application 534 and processes or systems external to application container 530.

As illustrated in FIG. 5, security layer 532 is configured with an intermediary level of encryption that requires the use of key management service 520. Key management service 520, in this example, obtains or checks out a security key from HSM 510 to encrypt data transferred from application container 530. Once the data is encrypted using the key obtained from HSM 510, key management service 520 returns the encrypted data to application container 530 and application 534. Accordingly, rather than forwarding the data through the HSM, key management service 520 may encrypt the data directly, shortening the path that is otherwise required for the most sensitive data.

For example, application container 530 may comprise a front end application that receives and stores user profiles to a storage repository. As it is unnecessary for application 534 to identify the individual user data, security layer 532 may be configured to transfer data to key management service 520 for encryption. Once the data is encrypted using a borrowed key from HSM 510, the encrypted profile data is returned for processing with application 534. Accordingly, the application may process the data without identifying that the data has been encrypted.

Figure 6:
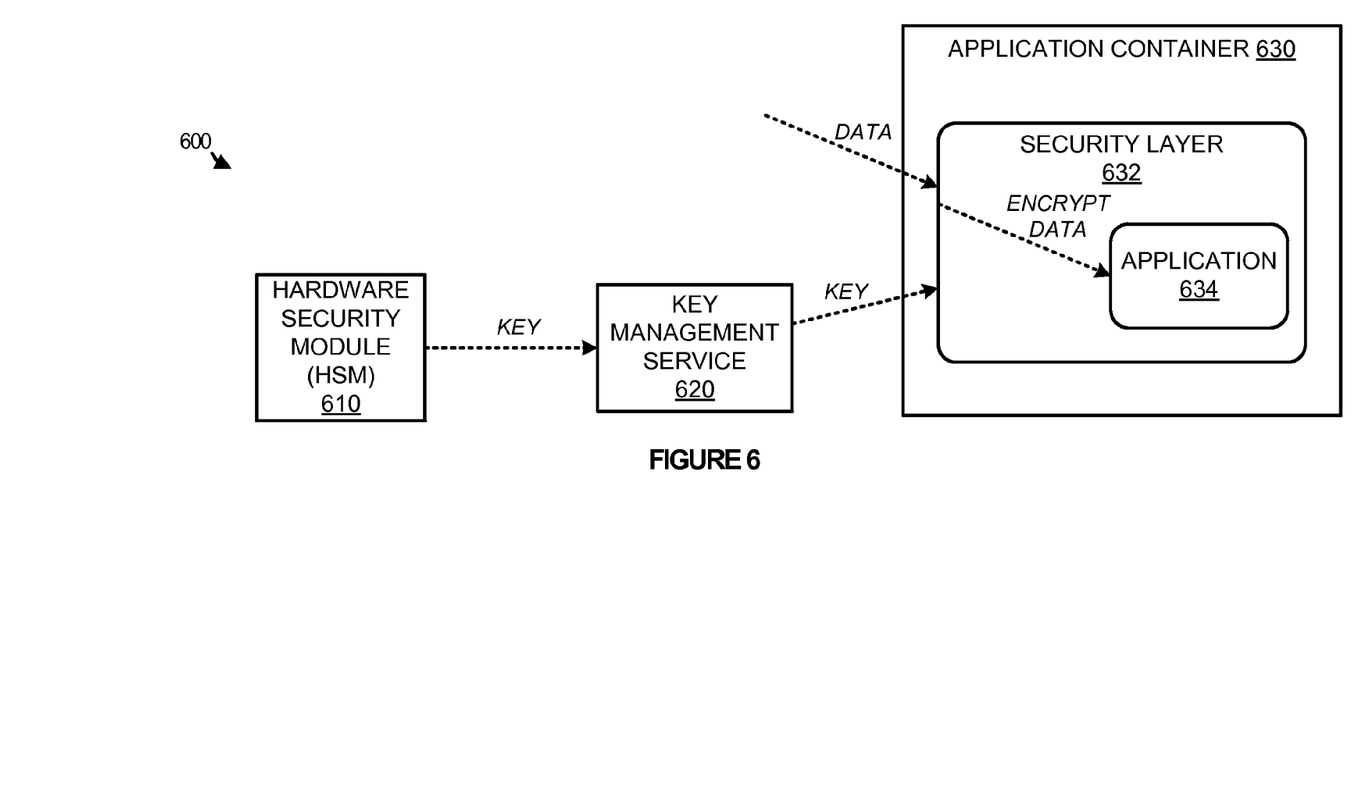
FIG. 6 illustrates an overview of encrypting data for an application container using the security layer of the application container.

Referring now to FIG. 6, FIG. 6 illustrates an overview 600 of encrypting data for an application container using the security layer of the application container. Overview 600 includes hardware security module (HSM) 610, key management service 620, and application container 630. Application container 630 further includes security layer 632, which is used to provide intermediary security between application 634 and processes external to application container 630.

Similar to the operations described in FIGS. 4-5, security layer 632 is configured with encryption parameters to encrypt data prior to the data being delivered for processing by the application. Here, security layer 632 is configured by a management system, such as key management service 620, to encrypt data received using a key that is obtained from key management service 620 and hardware security module 610. Accordingly, once application container 630 receives data for application 634, security layer 632 intercepts the data and encrypts the data using the key provided by key management service 620. Once the data is encrypted, the encrypted data may then be provided to application 634.

By providing an encryption layer between the application and processes or systems external to the container, the application may process the data without having access to the true values of the sensitive data. As a result, applications that are used for tasks, such as organization, may process the data without identifying or having access to the sensitive information.

Although illustrated in the present example as receiving the encryption key from key management service 620, it should be understood that key management service 620 might direct HSM 610 to directly supply security layer 632 with the encryption key. Further, in some instances, the supplying of the encryption key to security layer 632 may be the lowest level of security for application data. Thus, the most secure level for encrypting the data may be to use the HSM directly, the second most secure level may be to use a borrowed key in the key management service, and the least secure method may be to use a borrowed key in the encryption layer of the application container.

While the examples described in FIGS. 4-6 provide instances of encrypting data as the application containers receive the data, it should be understood that similar methods might be used to decrypt the data as the application containers receive the data. For instance, data may be transferred to the HSM to decrypt data if the data is of high sensitivity. Moreover, while the examples described above describe encrypting data as it is received at an application container, it should be understood that similar principles might apply to encrypting data prior to transferring the data out of the application container. For example, if an application needed access to credit card records, the credit card records could be decrypted prior to being provided to the application. Then, if the data were to be transferred to an application or system that did not require access to the unencrypted data, the credit card records may be re-encrypted using the methods described above, including passing the data to a HSM, transferring the data to key management service, or encrypting the data locally using borrowed keys.

Figure 7:
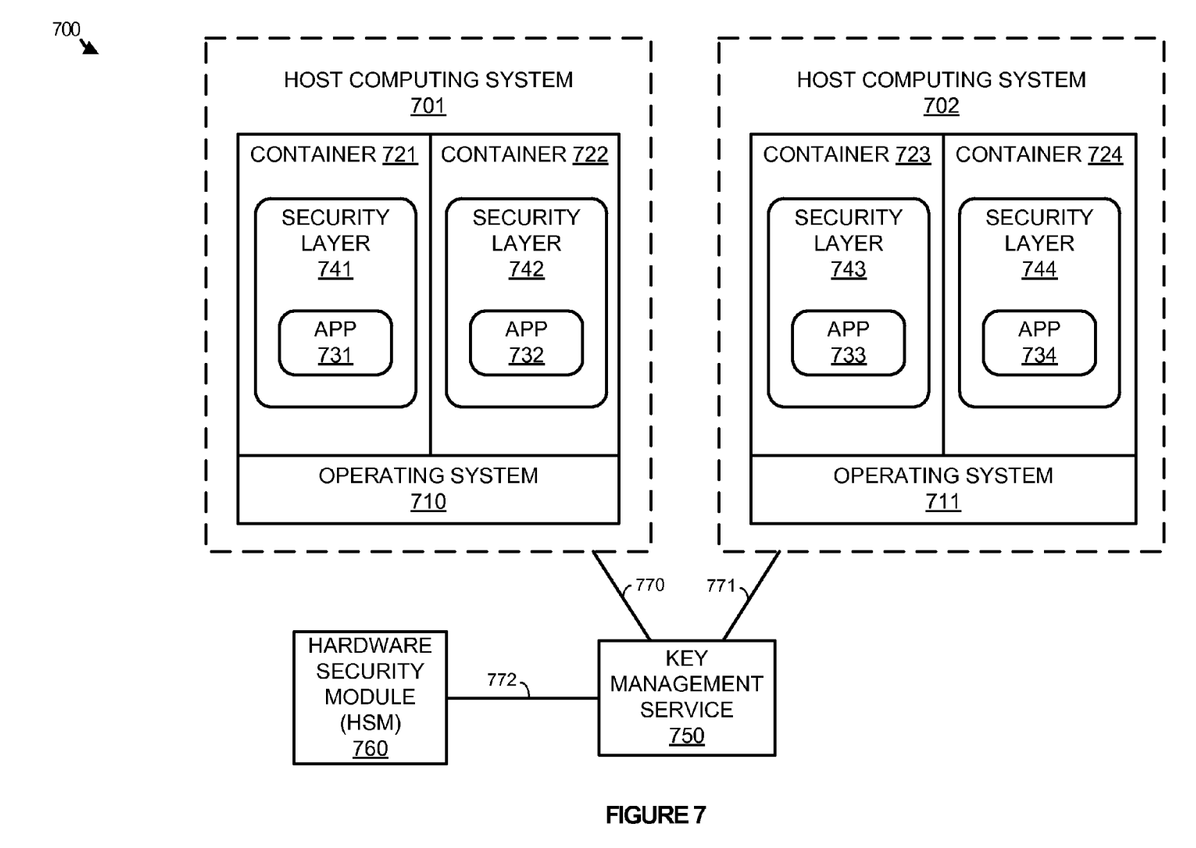
FIG. 7 illustrates a computing system for encrypting data using varying encryption methods.

Turning to FIG. 7, FIG. 7 illustrates a system 700 for encrypting data using varying encryption methods. System 700 includes host computing systems 701-702, key management service 750, and hardware security module (HSM) 760. Host computing systems 701-702 further include operating systems 710-711 and application containers 721-724. Host computing systems 701-702 communicate with key management service 750 over communication links 770-771, and key management service 750 further communicates with HSM 760 over communication link 772.

Host computing systems 701-702, key management service 750, and HSM 760 may each comprise a router, server, memory device, software, processing circuitry, cabling, power supply, network communication interface, structural support, or some other communication or computer apparatus. In some examples, host computing systems 701-702, key management service 750, and HSM 760 may each comprise one or more server computers, desktop computers, laptop computers, or other similar computing devices. Although illustrated in the present example as separate elements, it should be understood that HSM 760 might be implemented wholly or partially on the same device or devices as key management service 750. Further, although illustrated as a separate computing device, it should be understood that key management service 750 might be implemented wholly or partially with host computing systems 701-702.

Communication links 770-772 each use metal, glass, optical, air, space, or some other material as the transport media. Communication links 770-772 may use Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Communication links 770-772 may each be a direct link, or may include intermediate networks, systems, or devices, and may include a logical network link transported over multiple physical links.

In operation, application containers 721-724 are instantiated on host computing systems 701-702. Application containers 721-724 package an application and its dependencies in a virtual package, and run the containerized applications as an isolated process in userspace on the host operating system. Application containers 731-734 may include Linux containers, jails, partitions, or other types of containment modules, and may also include full operating system virtual machines in some examples. In the present instance, in addition to applications 731-734, each of the containers further includes a security layer that is used as an intermediary between the application within the container, and processes systems external to the container. Thus, the security layer may include firewall, encryption, and communication interface modules that are used to insulate the application from inappropriate communications.

Here, security layers 741-744 are configured for encryption based on the security level for the application, which may be assigned by an administrator, based on the sensitivity of the data processed by the application, assigned based on the identity of the application, or any other similar security identifier. This encryption configuration may be transferred to the security layer during initiation of the application container on the host computing system, or may be transferred to the application containers during the provisioning of the application containers. Once the encryption configuration is transferred to the application container by key management service 760 or some other management system, the security layers may then implement the configurations for the particular application. These security configurations may modify the way that data is encrypted or decrypted when the data is received by an application container, or may modify the way that data is encrypted or decrypted as the data is transferred from the application container.

In some examples, the security levels and corresponding encryption methods may specify the module that is to be used in encrypting the data. For instance, data encryption may be accomplished using HSM 760, may be accomplished using key management service 750, or may be accomplished within security layers 741-744. In situations where the data is the most sensitive, the data may be transferred, upon receipt at the application container, to HSM 760 for encryption. Once encrypted, the data may then be returned for processing using the intended application. In other intermediate examples, data may be transferred from an application container to key management service 750. Key management service 750 may use keys obtained or borrowed from HSM 760 to encrypt the data and return the data to the application container. In further instances, the security layer within the application container may be used to encrypt data using keys obtained from key management service 750. As a result, as data is received at an application container, the security layer may encrypt the data before providing the data to the corresponding application.

As illustrated in FIG. 7, each of containers 721-724 includes a separate and distinct security layer 741-744. Consequently, each of the application containers may be configured differently based on the needs and sensitivity of the corresponding application. For example, container 721 may be a front end server that manages the storage of end user social security numbers. Because the data is sensitive and important to the end user, security layer 741 may direct incoming data to HSM 760 to handle the encryption of data for application 731. In contrast, if container 722 comprises a front end application to store end user preferences, the data may be less sensitive, allowing encryption to take place using security layer 742. Thus, security layer 742 may check out or obtain keys from key management service 750 and use the keys to encrypt the data before passing the data to application 732.

Although illustrated in system 700 with two host computing devices, it should be understood that any number of host computing devices may be implemented within the computing system. Further, although four application containers are provided in system 700, it should be understood that hosts may handle greater or fewer numbers of application containers based on the needs of system administrators.

While described in previous examples as providing a single configuration for each of the security layers, it should be understood that multiple configurations may be implemented within each of the security layers. Accordingly, if multiple types of data are transferred or received for an application within an application container, different configurations may be delivered to the security layer for each level of security in the data. For example, data with a high security level may be encrypted using a first method, and data with a low security level may be encrypted using a second method. Thus, it may be necessary to provide multiple encryption configurations depending on the requirements of the data processed by the application.

Figure 8:
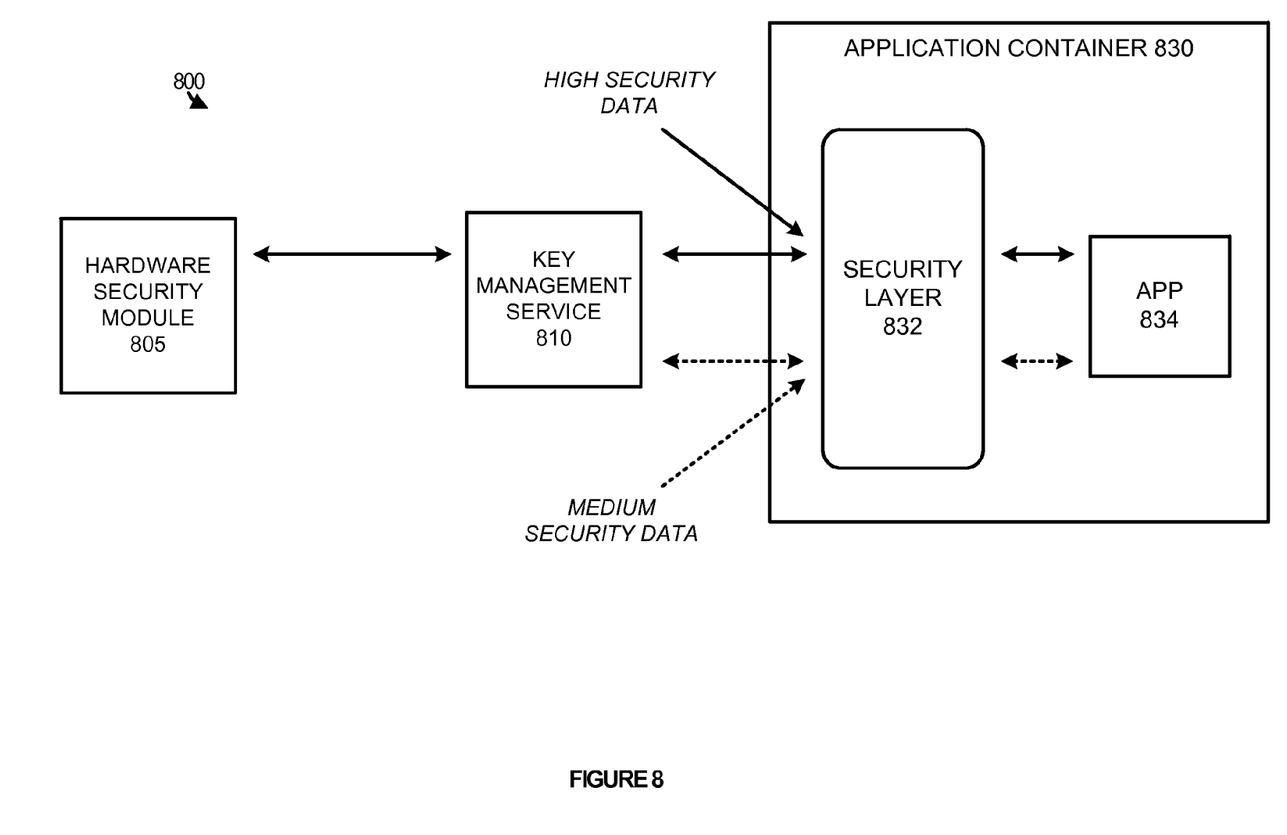
FIG. 8 illustrates a computing environment for encrypting data using varying encryption methods.

To further illustrate the implementation of multiple encryption configurations, FIG. 8 is provided. FIG. 8 illustrates a computing environment 800 for encrypting data using varying encryption methods. Computing environment 800 includes hardware security module (HSM) 805, key management service 810, and application container 830. Application container 830 further includes application 834 and security layer 832, which acts as an encryption intermediary between application 834 and at least one process or system external to application container 830.

In operation, data will be transferred and received by application 834 in application container 830. To encrypt the data, security layer 832 has implemented multiple encryption configurations based on the different types of data for application 834. As illustrated, the data received for application 834 includes high and medium security data, each with a different encryption configuration. First, with reference to the high security level data, data is received by security layer 832 from another application, storage system, or computing system, and then passed to HSM 805 via key management service 810. Once received, HSM 805 will encrypt the data and return the data to application container 830 to be processed by application 834. In contrast, medium security level data may be received by security layer 832 and redirected to key management service 810. Key management service 810 will encrypt the data using a borrowed or checked out key and return the data to application container 830 to be processed by application 834.

Although illustrated in the present example with two configurations for two security levels of data, it should be understood that any number of security levels might be implemented within security layer 832. For example, if application container 830 received lower security data, security layer 832 may be used to internally encrypt the data using a borrowed key from key management service 810 or some other encryption process.

Figure 9:
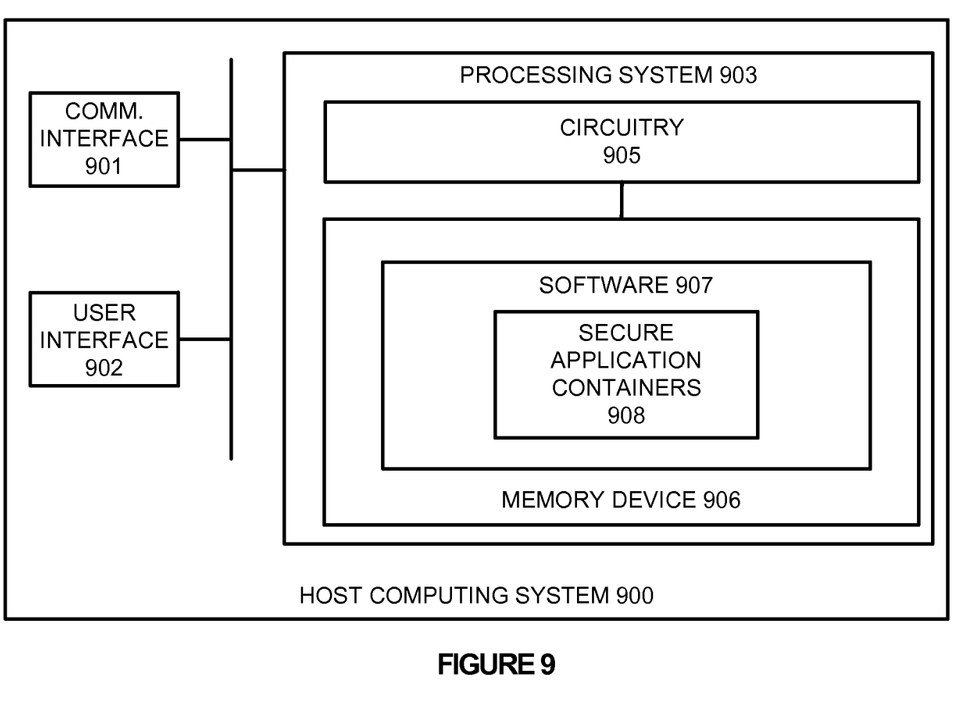
FIG. 9 illustrates a host computing system configured with multiple secure application containers.

FIG. 9 illustrates a host computing system 900 to provide a platform for secure application containers. Host computing system 900 is representative of a computing system that may be employed in any computing apparatus, system, or device, or collections thereof, to suitably implement the host computing systems described herein capable of providing a platform for secure application containers. Computing system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, Internet Protocol (IP), Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes secure application containers 908, which each include one or more applications and a security layer. Operating software 907 may further include an operating system, utilities, drivers, network interfaces, applications, or some other type of software. When executed by circuitry 905, operating software 907 directs processing system 903 to operate host computing system 900 as described herein.

In particular, host computing system 900 comprises software and other processing elements capable of providing a platform for secure application containers 908. Application containers 908 include an application specified by an administrator or some other management process, and further include a security layer that acts as an intermediary between the containerized application and communications from processes or systems external to the application container. Specifically, the application containers rely on the operating system kernel functionality to provide resource isolation for the host computing elements, such as the processing unit, memory, block input/output, network, and other similar elements. Accordingly, the security layer and the application may execute without acknowledging other processes on the same host computing system.

In the present example, each application container of application containers 908 can be configured with one or more encryption configurations for data entering and leaving the application container. These encryption configurations may be based on a security level defined by an administrator, a security level determined from the sensitivity of the data, a security level based on the identity of the application within the container, or any other similar configuration basis. In some instances, the application data with the highest level of security may optimally use a HSM to handle the encryption of data, the medium level of security may use a key management service that obtains a key for encrypting data, and the lowest level may use the security layer within the application containers and a borrowed key to encrypt the data. In addition to assisting in the encryption of data for the application containers, the key management service may also maintain and manage the various keys that are used with the application containers outside of the HSM. Thus, the key management service may maintain records of the various keys provided for encrypting the data for the various applications.

By handling the encryption of the data external to the applications themselves, an administrator or other management process may minimize the number of applications or processes that have access to the data. For example, an application that organizes social security numbers and credit card numbers may not need to view or have access to the actual social security and credit card values. Consequently, rather than providing the application with the real values, the numbers may be encrypted before being processed by the application, limiting the number of applications and processes that have access to the real values.

Figure 10:
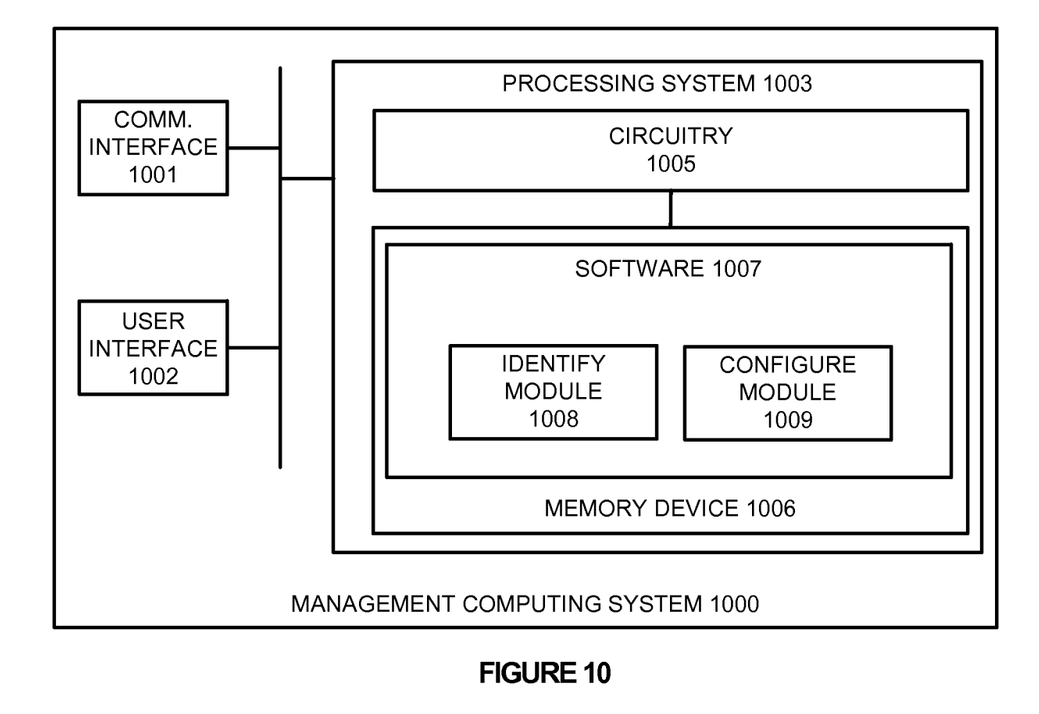
FIG. 10 illustrates a management computing system to provide encryption configurations to secure application containers.

FIG. 10 illustrates a management computing system 1000 to provide encryption configurations to secure application containers. Management computing system 1000 is representative of a computing system that may be employed in any computing apparatus, system, or device, or collections thereof, to suitably implement the management computing systems described herein capable of identifying and transferring encryption configurations. Management computing system 1000 may comprise a key management service, such as key management service 120, but may also comprise any other configuration management computing system, such as management system 340, to configure application containers. Computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, Internet Protocol (IP), Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples. In some examples, user interface 1002 is configured to receive user specifications or preferences regarding the security level for the application. Based on these preferences, an encryption configuration may be generated to be implemented for the security layer of the application.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes identify module 1008 and configure module 1009, although any number of software modules may provide the same functionality. Operating software 1007 may further include an operating system, utilities, drivers, network interfaces, applications, or some other type of software. When executed by circuitry 1005, operating software 1007 directs processing system 1003 to operate management computing system 1000 as described herein.

In particular, identify module 1008 is configured to, when executed by management computing system 1000, identify a security level for an application container. This security level may be based on user input, such as a specification of the security level needed, may be based on the type of data processed within the application, or may be based on the identity of the application itself. For example, data objects like social security numbers may require a higher level of encryption than data that is used to save user preference information. Once a security level is identified for an application container, configure module 1009 is configured to determine an encryption configuration for the application container.

In some examples, the encryption configuration determines the location for data to be encrypted, such as in a HSM, in a key management service, or in the security layer itself. The HSM is a physical computing device that safeguards keys for strong encryption, the key management service is used to manage the keys used in encrypting the data, and the security layer is used to provide a wide variety of security safeguards between the application and processes or systems external to the application container.

After the configuration is determined for a particular application container, the configuration is transferred to the application container for implementation. In some examples, the transfer to the application occurs when the application container is initialized on a host computing system. Thus, when the container is initialized, a management module or other similar module may request management computing system 1000 for the appropriate encryption configuration for the application. Based on the request, the appropriate configuration will be determined and transferred to the application container to be implemented within the security layer. In other examples, the transferring of the encryption configuration may include transferring the configuration to the security layer while the application is being provisioned. Accordingly, when the application is initialized within a host computing system, the security layer is already configured for the encryption.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a management system to provide encryption configurations to secure application containers, the method comprising:
   identifying an encryption configuration from a plurality of encryption configurations for an application container; and
   transferring the encryption configuration to the application container, wherein the encryption configuration configures a security layer in the application container to act as an encryption intermediary between an application in the application container and at least one process or system external to the application container.

2. The method of claim 1 wherein identifying the encryption configuration from the plurality of encryption configurations comprises:
   identifying a security level for the application container; and
   determining the encryption configuration from the plurality of encryption configurations based on the security level.

3. The method of claim 2 wherein identifying the security level for the application container comprises identifying one of a high security level, a medium security level, or a low security level for the application container based on security information.

4. The method of claim 3 wherein the security information comprises administrator specified security information.

5. The method of claim 3 wherein the security information comprises sensitivity information for data processed by the application.

6. The method of claim 3 wherein the security information comprises an identifier for the application in the application container.

7. The method of claim 3 wherein determining the encryption configuration from the plurality of encryption configurations based on the security level comprises:
   if the security level for the application container comprises the high security level, identifying a first encryption configuration, wherein the first encryption configuration configures the security layer to transfer data to a hardware security module (HSM) for encryption;
   if the security level for the application container comprises the medium security level, identifying a second encryption configuration, wherein the second encryption configuration configures the security layer to transfer data to a key management system that obtains encryption parameters from the HSM for encryption; and
   if the security level for the application container comprises the low security level, identifying a third encryption configuration, wherein the third encryption configuration configures the security layer to encrypt data using encryption parameters obtained from the HSM.

8. The method of claim 1 further comprising receiving an encryption configuration request from the application container, and wherein identifying the encryption configuration from the plurality of encryption configurations for the application container comprises, in response to receiving the encryption configuration request, identifying the encryption configuration from a plurality of encryption configurations for the application container.

9. The method of claim 1 wherein transferring the encryption configuration to the application container comprises provisioning the application container with the encryption configuration for the security layer.

10. A computer apparatus to provide encryption configurations to secure application containers, the computer apparatus comprising:
    processing instructions that direct a management system, when executed by the management system, to:
      identify an encryption configuration from a plurality of encryption configurations for an application container; and
      transfer the encryption configuration to the application container, wherein the encryption configuration configures a security layer in the application container to act as an encryption intermediary between an application in the application container and processes external to the application container; and
    one or more non-transitory computer readable media that store the processing instructions.

11. The computer apparatus of claim 10 wherein the processing instructions to identify the encryption configuration from the plurality of encryption configurations direct the management system to:
    identify a security level for the application container; and
    determine the encryption configuration from the plurality of encryption configurations based on the security level.

12. The computer apparatus of claim 11 wherein the processing instructions to identify the security level for the application container direct the management system to identify one of a high security level, a medium security level, or a low security level for the application container based on security information.

13. The computer apparatus of claim 1 wherein the security information comprises administrator specified security information.

14. The computer apparatus of claim 12 wherein the security information comprises sensitivity information for data processed by the application.

15. The computer apparatus of claim 12 wherein the security information comprises an identifier for the application in the application container.

16. The computer apparatus of claim 12 wherein the processing instructions to determine the encryption configuration from the plurality of encryption configurations based on the security level direct the management system to:
- if the security level for the application container comprises the high security level, identify a first encryption configuration, wherein the first encryption configuration configures the security layer to transfer data to a hardware security module (HSM) for encryption;
- if the security level for the application container comprises the medium security level, identify a second encryption configuration, wherein the second encryption configuration configures the security layer to transfer data to a key management system that obtains encryption parameters from the HSM for encryption; and
- if the security level for the application container comprises the low security level, identifying a third encryption configuration, wherein the third encryption configuration configures the security layer to encrypt data using encryption parameters obtained from the HSM.

17. The computer apparatus of claim 10 wherein the processing instructions further direct the management computing system to receive an encryption configuration request from the application container, and wherein the processing instructions to identify the encryption configuration from the plurality of encryption configurations for the application container direct the management system to, in response to receiving the encryption configuration request, identify the encryption configuration from the plurality of encryption configurations for the application container.

18. The computer apparatus of claim 10 wherein the processing instructions to transfer the encryption configuration to the application container direct the management system to provision the application container with the encryption configuration.

19. An application container to isolate an application from one or more other processes executing outside of the application container, the application container comprising:
- the application; and
- a security layer configured to act as an intermediary between the application and at least one process or system external to the application container, wherein the security layer comprises an encryption module configured to encrypt data communications for the application based on a security level for the application container.

20. The application container of claim 19 wherein the security level for the application container comprises one of a high security level, a medium security level, or a low security level for the application container based on security information.

* * * * *